US008747210B2

(12) United States Patent
Kennedy

(10) Patent No.: US 8,747,210 B2
(45) Date of Patent: Jun. 10, 2014

(54) APPARATUS AND METHODS FOR PLAYING ELECTRONIC TABLE CARD GAMES

(71) Applicant: Julian J Kennedy, Sylva, NC (US)

(72) Inventor: Julian J Kennedy, Sylva, NC (US)

(73) Assignee: Vegas Amusement, Inc., Mountain Rest, SC (US)

( * ) Notice: Subject to any disclaimer, the term of this patent is extended or adjusted under 35 U.S.C. 154(b) by 0 days.

(21) Appl. No.: 13/775,117

(22) Filed: Feb. 22, 2013

(65) Prior Publication Data

US 2013/0217455 A1 Aug. 22, 2013

Related U.S. Application Data

(60) Provisional application No. 61/601,561, filed on Feb. 22, 2012.

(51) Int. Cl.
*A63F 13/00* (2014.01)

(52) U.S. Cl.
USPC .............................................. 463/17; 463/20

(58) Field of Classification Search
USPC .................................... 463/16, 20–25, 40–43
See application file for complete search history.

(56) References Cited

U.S. PATENT DOCUMENTS

| | | | | |
|---|---|---|---|---|
| 4,861,041 | A | 8/1989 | Jones et al. | |
| 6,474,649 | B1 | 11/2002 | Kennedy et al. | |
| 7,980,933 | B2 | 7/2011 | Kennedy | |
| 2006/0111167 | A1* | 5/2006 | Breslo | 463/13 |
| 2007/0259714 | A1* | 11/2007 | Block et al. | 463/29 |
| 2009/0111570 | A1* | 4/2009 | Yoshizawa | 463/20 |
| 2009/0270174 | A1* | 10/2009 | Kelly et al. | 463/42 |
| 2009/0270175 | A1* | 10/2009 | Kelly et al. | 463/42 |
| 2010/0197379 | A1* | 8/2010 | Cannon | 463/21 |
| 2012/0184344 | A1* | 7/2012 | Baerlocher et al. | 463/17 |
| 2012/0238337 | A1* | 9/2012 | French | 463/11 |

* cited by examiner

*Primary Examiner* — Masud Ahmed
(74) *Attorney, Agent, or Firm* — William A Blake

(57) ABSTRACT

Electronic card game devices and methods incorporate progressive jackpot operations controlled by a central server computer. If a system game device is selected by the central server computer to win a progressive jackpot award, the system game device is programmed to display secondary game outcome symbols on playing cards being displayed during game play to indicate winning of the award.

10 Claims, 13 Drawing Sheets

FIG. 10A
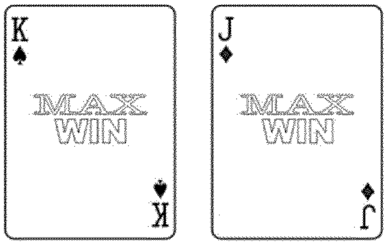
FIG. 10B
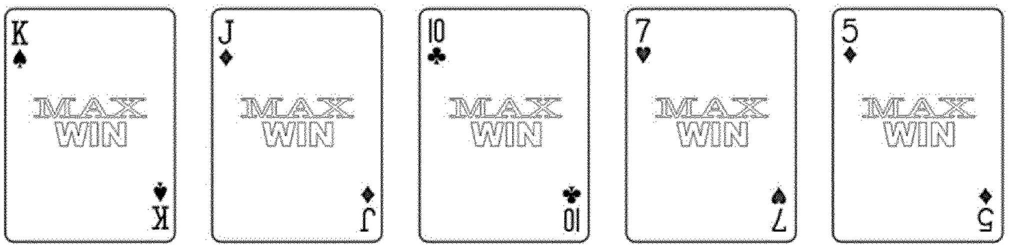
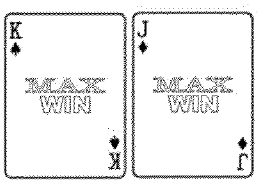
FIG. 10C
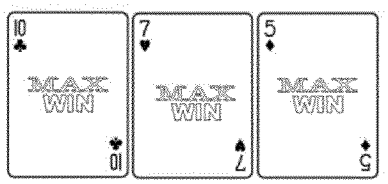
FIG. 10D
FIG. 10E
FIG. 10F

APPARATUS AND METHODS FOR PLAYING ELECTRONIC TABLE CARD GAMES

BACKGROUND OF THE INVENTION

1. Field of the Invention

The present invention relates to electronic card game devices and methods that incorporate progressive jackpot operations controlled by a central server computer.

2. Description of the Background Art

Electronic card game devices exist in many forms and are known to those skilled in the art. For example, eTables are multiplayer electronic gaming machines that enable one or more players to play a card game. An example is a multiplayer electronic table game that in operation utilizes a common display for view of all game activity and is marketed under the brand name TABLEMAX. This product and features thereof are disclosed in U.S. Pat. Nos. 5,688,174, 6,921,337, 7,201,661 and 7,575,512, as well as US Published Patent Application 20090253480, each of which is hereby incorporated herein by reference and each includes the inventor of the claimed subject invention as the sole or a joint inventor. These patents and application disclose various features of multi-player card gaming devices including touch screen panels at player stations and server based gaming aspects, for example.

Another form of electronic table card game is disclosed in US Published Patent Application 20110177854, which is also incorporated herein by reference and is to the inventor of the subject invention. This application describes an electronic table device product marketed under the brand name BAR-MAX in which a system of multiple bar top gaming terminal devices and a common display are employed to facilitate the play of multiplayer electronic table card games using the common display to display game play and the outcome of the multiplayer games. Each of the bar top terminal devices can either be used as a standalone single player gaming terminal or as a player station in the multiplayer game. In addition, the terminals can be configured to play single player and multiple player games simultaneously.

U.S. Pat. No. 6,474,649, which names the same inventor of the subject invention as a joint inventor, is also incorporated by reference herein. This patent discloses a modified version of the play for utilization with card games in which unique symbols which are different from the standard markings on the otherwise conventional playing cards are provided on a select number of the playing cards. The unique symbols may be associated to a player by providing a respective unique symbol at each player station of a card game table, and each player being assigned a player station. Each player optionally places a bet upon a chance that predetermined event will occur. Cards are dealt to the players and to a dealer according to a set of rules. If a predetermined event occurs wherein one or more of the player's cards and the dealer's cards having a playing card with a unique symbol corresponding with the player's associated unique symbol, that player is paid a return amount.

U.S. Pat. No. 7,980,933, which is also incorporated by reference herein and names the same inventor as that of the subject invention, discloses methods of electronic card game play involving certain progressive gaming functionality which is incorporated into a commercial progressive system brand named MAXLINK. More particularly, the '933 patent discloses methods of electronic card game play wherein during play of a first card game, an outcome of a second game of chance is displayed as an attribute of an electronic card used in play of the first card game. Examples include generation of one or more game outcomes of an independent game of chance, such as a dice game, a lottery, or another card game, and assignment of a graphical depiction of the second game outcome on one or more of the cards played in the first card game.

U.S. Pat. Nos. 4,861,041 and 5,087,405 (both to Jones et al.) disclose methods and apparatus for progressive jackpot gaming, respectively. The former patent discloses that a player may make an additional wager at the beginning of a hand, the outcome of the additional wager being determined by of a predetermined arrangement of cards in the player's hand.

One known form of progressive jackpot gaming employs what is referred to as a wide area progressive system (WAN) in which a plurality of electronic gaming machines each share in the progressive contribution to and potential award payout from a common jackpot. A specific form of WAN known as a central determination wide area progressive system (CD-WAP) employs a central server computer in operative communication with one or more gaming devices to conduct a progressive jackpot. These are progressive systems employed with slot machines, such as MEGABUCKS from IGT, wherein the determination of the wide area jackpot award is performed by a calculation upon the central server computer connected to one or more slot machines. Typically, a single controller in the central server computer awards the jackpot and communicates this information to a client slot machine in operative communication with the central server computer for display to the player upon a selected device.

In one illustrative example, each client gaming device enables play of a game with a progressive feature. The central server computer maintains a progressive jackpot amount. Before the commencement of play upon said client gaming devices, each device communicates with the central server computer and submits a request to determine if the next play of the device is a progressive jackpot winner. If the request response is negative, the client gaming device conducts the next play of the device and does not award said progressive jackpot feature. Alternatively, if the request response is positive, the client device will award the progressive jackpot amount upon the next play of the device.

Numerous variations of slot machine CDWAPs exist. Client devices that gather multiple progressive outcome decisions per communication with a CDWAP and then queue them for future iterations of play into the future are known. Also, in the case of internet based games, conducting a function call to a CDWAP and responding accordingly thereafter to said response before each play of a game is common.

In the use of the aforementioned MEGABUCKS brand slot machines marketed by IGT, players play slot machines and have a chance to win a large progressive jackpot. Typically the jackpot starts at $10,000,000 and winners are paid with annuities. These jackpots attract players and the payment of the jackpot amount in the form of an annuity is a profitable activity for IGT.

In addition to CDWAPs, many known gaming devices operate with the client devices determining if a player wins a progressive jackpot award. Often in single location casinos, local lower value progressive amounts are aggregated and awarded by banks of gaming machines. A common example would be ten or twenty video poker devices, such as those marketed by IGT under the brand name BONUS POKER, that accumulate progressive values and award a smaller jackpot to the first player to obtain a predetermined hand such as a Royal Flush. In this embodiment each of the client devices can generate and award the progressive value that is shared amongst the devices.

Although these configurations are quite popular, typically they are offered with lower value progressives. A number of reasons exist for this including the criteria upon which card games can possibly award a jackpot value and also the architecture that relies upon many individual video poker devices calculating and awarding the progressive jackpot independently. Machine malfunctions are known and are a material consideration in operation of wide area systems. Thus, the more devices that are relied upon to calculate and award a progressive jackpot, the more likely it is that a malfunction will occur during game play that could interfere with each payer's satisfaction in playing the game.

Live table systems utilize a similar technology whereby a common computer or server will simply accumulate a progressive jackpot amount and this said server is in operative communication with one or more client live tables typically with electronic displays. When a live dealer deals a certain predetermined hand to a player, the progressive jackpot is awarded to said player. These systems are common in live card games wherein a dealer will deal and verify a jackpot award to a player.

Although slot machine CDWAPs are well known and quite a mature technology, a fundamental problem exists in the gaming industry in regards to operating electronic card games in a WAP mode of operation offering large wide area progressive jackpots. Currently, eTables such as TABLEMAX operate progressive card games utilizing the aforementioned system of progressive operation wherein a WAP server computer accumulates a jackpot amount. However, the individual gaming application upon each eTable performs the determination and awarding step of the jackpot award amount. This configuration is similar to the IGT Bonus Poker configurations detailed above and inherently has the same stated limitations.

SUMMARY OF THE INVENTION

The present invention relates to improvements and new methods of operating video gaming devices to enable the play of multiplayer video table games. More particularly, the invention comprises new and improved methods and apparatus for playing of secondary game outcome-based card games, methods, server applications and logic, and secondary game outcome enabled WAP systems and methods of operations which address the previously discussed limitations of known WAP based electronic card games.

In all embodiments of the invention, a CDWAP arrangement is employed wherein a central WAP server computer controls the payout of a progressive award to one of a plurality of computer-based electronic card game devices. To avoid issues regarding differing odds of certain events occurring in different types of card games that may be implemented by the various card game devices, the central WAP server makes an award payout determination based on play of a game rather than any given outcome of a game. In addition, when the WAP server computer sends a communication to one of the card game devices that an award is to be paid to that device, the device is programed to generate one or more unique playing cards that include secondary game outcome symbols indicating that a player has won the award.

In one preferred embodiment of the invention, the hands of one or more playing cards can be determined prior to display in electronic card game play, whereby prior to display of said cards, secondary game outcome symbols can be calculated and assigned to the hands of cards as a group. In this embodiment, a card game application, prior to dealing cards used in game play, communicates with the WAP server. The calling card game application requests if a next hand used in card game play is a secondary game outcome award winner or not. Upon performing a calculation the WAP server communicates a response instruction to the calling card game application instructing a YES or NO value as to if the next card game play is a secondary game outcome award winner. The calling application processes the instruction as follows. If the instruction is NO, the calling card game application deals traditional cards upon the next said hand of cards used in card game play. If the instruction of YES, the calling card game application deals cards with secondary game outcome symbols upon the hand of cards as a group.

An electronic card game and/or networks of electronic card games can thus be operated in a manner whereby each hand dealt in a round of card game play has the same statistical chance of obtaining secondary game outcome symbols regardless of the cards used in the play of the game or the formation of a card game hand.

It should be understood that the methods disclosed herein are applicable to any type of electronic card game including, single terminal VLT devices, multiplayer eTable devices such as TABLEMAX and BARMAX, internet card games played by one or more players, home electronic card games played typically upon a computer or gaming system such as XBOX, PLAYSTATION, or similar devices.

BRIEF DESCRIPTION OF THE DRAWINGS

The features and advantages of the present invention will become apparent from the following detailed description thereof, taken in conjunction with the accompanying drawings, which are described briefly as follows.

FIG. 4A illustrates is a set of 5 traditional cards used in video poker game. FIG. 4B illustrates the same set of five cards as in FIG. 4A, except that secondary game outcome symbols spelling the word "LINGO" are displayed across the collection of all 5 cards used to form the 5 card video poker hand. FIG. 4C illustrates a five card poker hand including 3 secondary game outcome symbol cards and 2 traditional playing cards. In this depiction the word "WIN" is show to be spelled by assigning one letter to 3 consecutive cards used to form the 5 card poker hand in an electronic card game.

FIG. 5A illustrates is a set of 5 traditional cards used in video poker game. This is an illustration of the first 5 cards dealt initially in a video poker card game. FIG. 5B illustrates the same set of five cards as in FIG. 5A, whereby the $1^{st}$ and $2^{nd}$ cards have been selected to be discarded from the collection of cards populated from the initial deal of cards as depicted in FIG. 5A. FIG. 5C illustrates the video card game hand as detailed in FIG. 5A and FIG. 5B, whereby upon drawing replacements cards for said $1^{st}$ and $2^{nd}$ card discarded per FIG. 5B, the electronic video poker device performed a $2^{nd}$ secondary game outcome selection process prior to the display of the replacement cards being drawn. In this embodiment, as in FIG. 4B, it is illustrated that the word "LINGO" is drawn across the collection of all 5 cards used to form the 5 card video poker hand.

FIG. 6A illustrates a set of 5 traditional cards used in video poker game. FIG. 6B illustrates the same set of five cards as in FIG. 6A, except where the $2^{nd}$ card was discarded and redrawn to include a secondary game outcome symbol that spells the word "LINGO" upon the single card. This secondary game outcome symbol can be used to pay a secondary game outcome award and also can be used to enable the card game to utilize the card value, suit, or rank to be used as a wild card in the calculation of card game play rules and awards.

FIG. 8A illustrates is a set of 5 traditional cards used in video poker game. This is an illustration of the first 5 cards dealt initially in a video poker card game. FIG. 8B illustrates the same set of five cards as in FIG. 8A, whereby all cards have been selected to be populated with secondary game outcome symbols. FIG. 8C illustrates the same set of five cards as in FIG. 8A, except wherein 3 cards have been selected to be populated with secondary game outcome symbols.

FIGS. 10A-10F illustrate several differing hands of cards used in various electronic card games, with each of said cards having secondary game outcome symbols thereon in accordance with the embodiments of the present invention.

DETAILED DESCRIPTION OF THE INVENTION

1) Definitions

Figure 1:
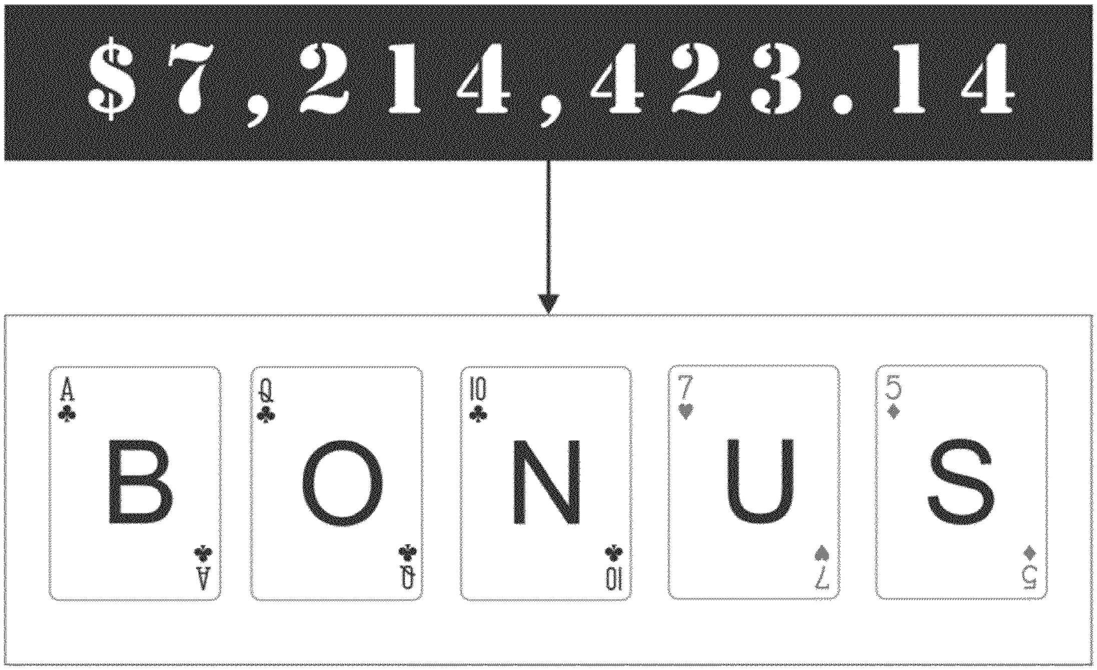
FIG. 1 illustrates a 5 card video poker hand that has been assigned secondary game outcome symbols to spell the word "BONUS" across the 5 card hand of cards. This hand is illustrated to be connected to a progressive display with a large wide area progressive (WAP) jackpot award of over $7 million dollars. Combined the intent of this illustration is to illustrate a winning secondary game outcome card game hand that obtains the jackpot total win amount.

The following are some definitions that are used in this document.

Secondary game outcome—this refers to electronic card games and associated card game technology that utilize playing cards, wagers, awards, progressives, or associated video card game elements that rely upon additional graphics/pictures/indicia upon playing cards representing the outcome of one or more secondary game(s) of chance.

Secondary game outcome symbols—one or more graphics/pictures/indicia upon electronic playing cards that display an outcome of one or more secondary games of chance. Secondary games can include actual or software generated card games, selection(s) of lottery ball(s) in a lottery draw, rolling of one or more dice, keno game(s) ball selection(s), bingo game ball(s) selection(s), slot machine symbol selection, random selection one or more graphical elements wherein one or more said elements have differing, the same, or no graphics upon them, outcome depictions of sporting events such as car races, dog races, horse races, selection of one or more letters of an alphabet from a collection of alphabet letters, selection of one or numbers of from a collection of numbers.

Secondary game outcome playing cards—electronic playing cards, having at least the card attributes of card suit and card value, used in an electronic card game wherein said playing cards have upon them one or more secondary game outcome symbols.

Secondary game outcome enabled WAP—Wide Area Progressive system utilized with electronic card games that uses in the play, award, or any operation secondary game outcome card games or secondary game outcome playing cards.

Secondary game outcome WAP server—server application, process, software application logic, or algorithm(s) used to generate a determination of game event outcomes and selection of symbols used in the application of secondary game outcome symbols to playing cards used in an electronic card game. The secondary game outcome server can calculate outcomes using random or any other means of calculation including weighted selection or and odds based assignment of symbols. Also, secondary game outcome server symbol selection can include instruction(s) to video card gaming application(s) instructing the assignment order of secondary game outcome symbols to one or more cards in a hand of playing cards.

Secondary game outcome award—a win, payment, or credits awarded based upon a wager whereby said wager award calculation was calculated in part based upon a secondary game outcome symbol being populated upon one or more cards in an electronic card game.

Traditional playing cards—cards with only standard markings including suits, color, and card values.

Electronic card game—any card game of any type played upon any electronic means including such card games as blackjack, poker, rummy, baccarat, and any card game variation. Any electronic means includes internet card games, video gaming devices, bar top video terminals, VLT terminals, eTables, mobile card games, PC based card games, home card games played upon TV or the internet, home console gaming systems such as XBOX and Nintendo. Any digital application that plays cards. Also, play of an electronic card game can be in any denomination of currency, credit, or monetary value.

2) Video Poker Based Game with Secondary Game Outcome Enabled WAP

With reference now to FIG. 1, a 5 card video poker hand is illustrated that has been assigned secondary game outcome symbols to spell the word "BONUS" across the 5 cards in the hand. The hand is illustrated to be connected to a progressive display with a large wide area progressive (WAP) jackpot award of over $7 million dollars. Combined the intent of this illustration is to illustrate a winning secondary game outcome card game hand that obtains the jackpot total win amount. As will be discussed in detail herein, each of the embodiments of the present invention employs a unique way by which awards in secondary game outcomes are determined among a number of various types of video card gaming devices.

Figure 2:
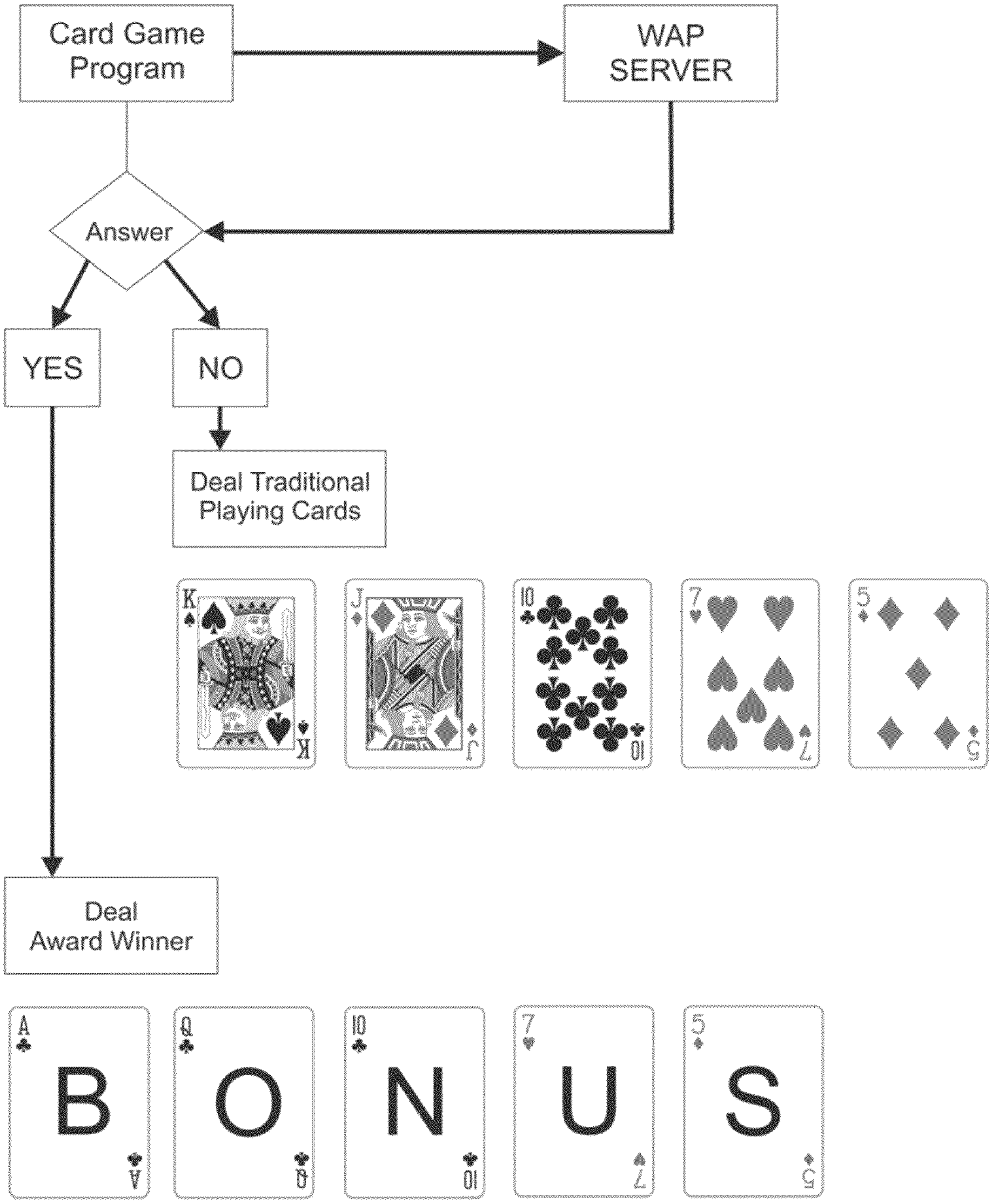
FIG. 2 illustrates a logic flow of a video poker game using the present invention whereby a card game program utilizes logic to assign secondary game outcome symbols upon playing cards. If a secondary game outcome logic process step determines not to assign secondary game outcome symbols, the card game application deals traditional playing cards. If the a secondary game outcome logic step determines to assign secondary game outcome symbols, the card game application assigns secondary game outcome symbols to one or more cards used in card game play. In this preferred embodiment, it is illustrated that the word "BONUS" is spelled by assigning one letter each of the 5 cards used to form a 5 card poker hand.

FIG. 2 illustrates a logic flow of a video poker game using the disclosed invention wherein a card game program utilizes logic to assign secondary game outcome symbols upon playing cards. If a secondary game outcome logic process step determines not to assign secondary game outcome symbols, the card game application deals traditional playing cards. If the a secondary game outcome logic step determines to assign secondary game outcome symbols, the card game application assigns secondary game outcome symbols to one or more cards used in card game play. In this preferred embodiment, it is illustrated that the word "BONUS" is spelled by assigning one letter each of the 5 cards used to form a 5 card poker hand.

Referring in more detail to the flow chart of FIG. 2, an electronic card game program communicates with a secondary game outcome Server to assign secondary game outcome symbols to cards. A request is made to said secondary game outcome server process to ascertain if said card game program should assign secondary game outcome symbols to cards or not.

In one preferred embodiment, if the response from the secondary game outcome server process is NO, said electronic card game program will draw traditional cards. If said response to secondary game outcome server process is YES, said electronic card game program will draw one or more secondary game outcome cards in a hand of cards played upon the program.

It is noted that any response from a secondary game outcome server could be received and result in an unlimited number of combinations of action instructions on part of the calling game application. Any response from a secondary game outcome server and/or any calculation by an electronic card game that assigns secondary game outcome symbols to one or more playing cards used to form a card hand, card group, card collection, or card game set is hereby disclosed as a preferred method of this invention.

Figure 3:
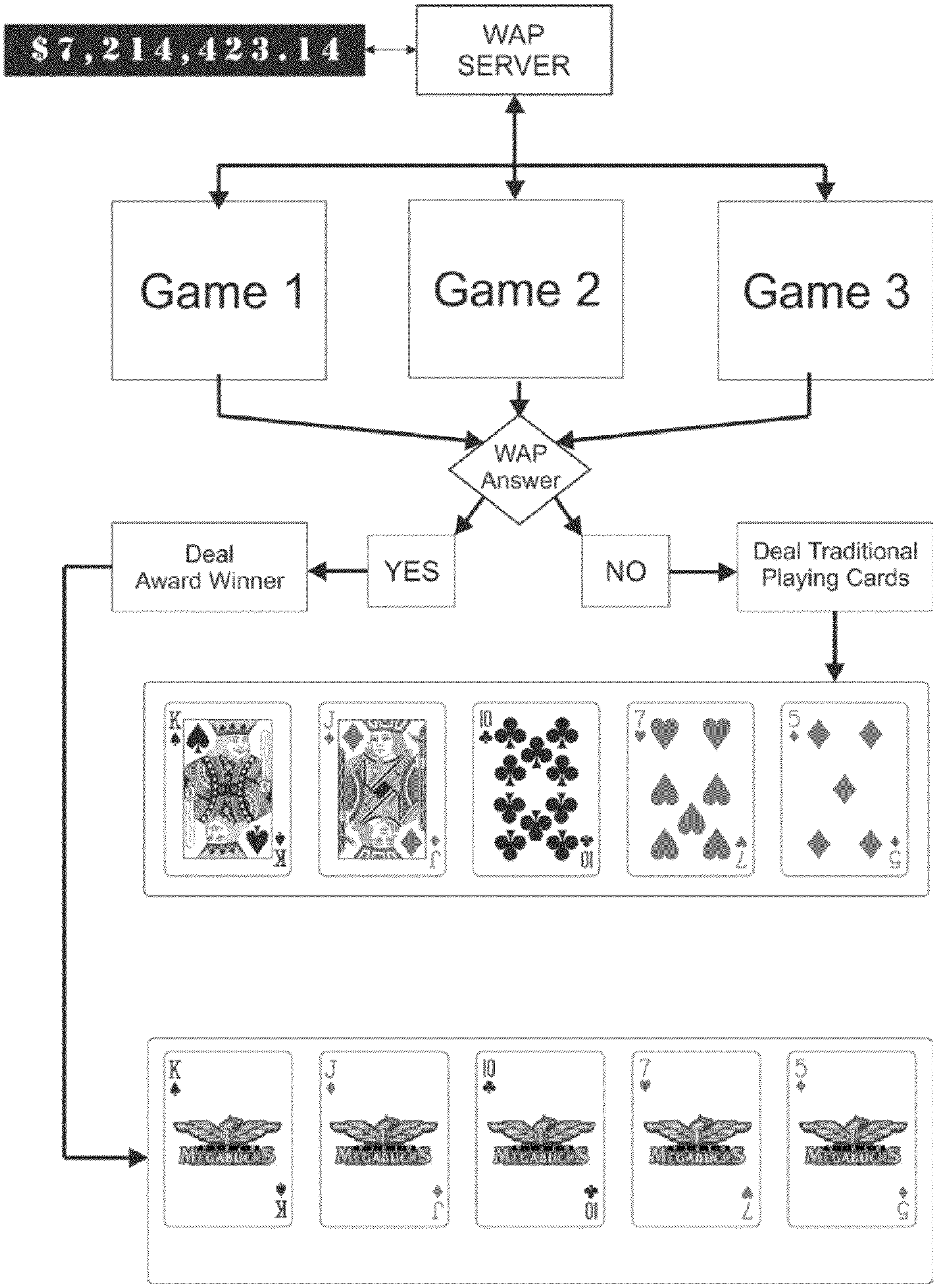
FIG. 3 illustrates a logic flow of a video poker wide area progressive system. Here a network of video poker games are connected to a secondary game outcome enabled wide area progressive (WAP) server. Each device is in operative communication and makes requests to the WAP Server to determine if the next card play is the WAP winner.

FIG. 3 illustrates a logic flow of a video poker wide area progressive system. Here a network of electronic video poker games are connected to a central, secondary game outcome enabled WAP server. Each of the games can be the same or can utilize differing card game rules, many variable options of card games to play, and in the case of some games, such as Triple Play and others, differing number of hands played from differing decks. In this preferred embodiment the WAP is a CDWAP, however, any method of WAP technology could be utilized.

Each game device is in operative communication and makes requests to the secondary game outcome WAP Server to determine if the next card play is the WAP jackpot award winner. If the next play is a WAP jackpot winner, the next hand of cards is assigned secondary game outcome symbols. If the exemplary embodiment is running in the state of Nevada, large WAP jackpots are possible due to an upper limit of WAP odds of 100,000,000 to 1 being possible to be operated by regulations. It is the intent of this illustration to show a variety of differing video poker devices connected to the WAP Server. Any video card game regardless of the number of cards used or the rules of the electronic card game can be connected to this WAP server as the secondary game outcome symbols are independent of the card game rules.

FIG. 3 further depicts the jackpot award whereby IGT MEGABUCKS logos are the secondary game outcome symbols and are assigned to a hand of cards to form a 5 card poker hand in the electronic card game play. This secondary game outcome symbol is a slot machine symbol depicting the outcome of a slot machine. In this case the slot machine is software version of the selection process of slot machine symbols utilizing the MEGABUCKS logo as an indication of a stop or selection of a slot machine virtual reel via software. It is further noted as detailed in U.S. Pat. No. 7,980,933 incorporated herein by reference that said secondary game outcome symbols can be graphics that depict celebrity likenesses, product logos, any type of artwork, etc. in addition to outcome indicia of a secondary game of chance. It is noted that any graphic can be randomly selected to be utilized as a secondary game outcome symbol.

Before each play of a next round upon any of the connected video poker devices, a request to the secondary game outcome enabled WAP is made to determine if the next hand will be a secondary game outcome award winner.

Also, many methods of receiving and requesting this data could be utilized. For example a method of queuing this data could be implemented including receiving batches of advance responses from said secondary game outcome server and storing these and utilizing with future rounds of game play. Also, the award of a jackpot does not have to be the next hand dealt or next round of card game play. A client device could receive an instruction that instructs the client device's card game program to award the secondary game outcome jackpot award at a later time or based upon a future occurrence happening at the said video poker device, such as at the next royal flush or at the next 3 rounds of card game play, for example.

As the client video poker devices make requests to the said secondary game outcome WAP server for determination in the next hand in card game play is the jackpot winner, responses that are negative result in the devices dealing hands other than the Jackpot award winning hand. This could include dealing traditional cards, some secondary game outcome cards with secondary game outcome symbol(s) other than those used to award the jackpot, or a combination of both.

Upon a client video poker device receiving a response from said secondary game outcome WAP server instructing said video poker device's program to award the next hand of cards utilized in the next (of a future) round of card game play the jackpot award, the video poker device awards the jackpot by dealing a hand of cards with a predetermined secondary game outcome symbol combination as displayed in FIG. 3. In this embodiment that is a MEGABUCKS logo displayed upon each of the cards in the 5 card video poker card hand.

In this preferred embodiment of said secondary game outcome enabled WAP server, the MEGABUCKS jackpot payment is paid with an annuity to the winning electronic card game player who obtained the jackpot. Other methods of payment are possible including cash, check, and electronic methods or the full or a fractional amount of the jackpot award.

The disclosed method and apparatus for jackpot award utilizing a secondary game outcome server is a significant improvement over the existing art of video poker game progressive operations.

Table 1 details an example of three differing video poker versions offered upon video poker devices as game choice options. These draw poker games are shown with the odds of winning the awards upon the respective electronic card games. It is shown the rarest event of the 3 games detailed is a natural royal flush in the game of Deuces Wild.

| Deuces Wild Hand | Pay | Odds | Probability | Return |
|---|---|---|---|---|
| Natural royal flush | 800 | 43,478 | 0.000023 | 0.01815400 |

This award level is not sufficient to pay a wide area award with many machines connected. Also, issues exist with the actual machines determining the awards when an award is very large and many machines are connected to the WAP this becomes a security concern for both fraud and machine malfunction.

Table 2 illustrates the improvement in this invention by offering a MEGABUCKS jackpot amount to each said video poker game while maintaining all existing game rules, pays, and operation of said game without any effect or change. Of course changes could be made. Also, it is a preferred embodiment to utilize secondary game outcome symbols for other more frequent pays in addition to the stated top level jackpot WAP win.

Table 3 details a summary of financial activity from a WAP network as disclosed with 1000 video poker devices participating. This ignores profit from operating the said annuity method of payment. It is disclosed that any electronic card game can simultaneously participate in any secondary game outcome enabled WAP.

TABLE 1

IGT Video Poker Pay tables

| | Pay | Odds | Probability | Return |
|---|---|---|---|---|
| Jacks or Better Hand | | | | |
| Royal flush | 800 | 40,177 | 0.00002489 | 0.01991548 |
| Straight flush | 50 | 9,289 | 0.00010766 | 0.00538321 |
| Four of a kind | 25 | 423 | 0.00236289 | 0.05907222 |
| Full house | 8 | 87 | 0.01151368 | 0.09210942 |
| Flush | 5 | 92 | 0.01090156 | 0.05450781 |
| Straight | 4 | 89 | 0.01123512 | 0.04494050 |
| Three of a kind | 3 | 13 | 0.07446275 | 0.22338824 |
| Two pair | 2 | 8 | 0.12929841 | 0.25859682 |
| Pair | 1 | 5 | 0.21507064 | 0.21507064 |
| | | | | 0.97298434 |
| Joker Poker Hand | | | | |
| Natural royal flush | 800 | 40,000 | 0.000025 | 0.01976900 |
| Five of a kind | 200 | 10,753 | 0.000093 | 0.01858700 |
| Wild royal flush | 100 | 9,615 | 0.000104 | 0.01039900 |
| Straight flush | 50 | 1,684 | 0.000594 | 0.02970600 |
| Four of a kind | 17 | 118 | 0.008507 | 0.14461200 |

TABLE 1-continued

IGT Video Poker Pay tables

| | Pay | Odds | Probability | Return |
|---|---|---|---|---|
| Full house | 7 | 64 | 0.015626 | 0.10938500 |
| Flush | 5 | 63 | 0.015839 | 0.07919500 |
| Straight | 3 | 59 | 0.016853 | 0.05056000 |
| Three of a kind | 2 | 8 | 0.133313 | 0.26662600 |
| Two pair | 1 | 9 | 0.110667 | 0.11066700 |
| Kings or better | 1 | 7 | 0.141348 | 0.14134800 |
| | | | | 0.98085400 |
| Deuces Wild Hand | | | | |
| Natural royal flush | 800 | 43,478 | 0.000023 | 0.01815400 |
| Four deuces | 200 | 5,236 | 0.000191 | 0.03815200 |
| Wild royal flush | 20 | 552 | 0.001812 | 0.03624000 |
| Five of a kind | 12 | 331 | 0.003018 | 0.03621000 |
| Straight flush | 9 | 200 | 0.004994 | 0.04495000 |
| Four of a kind | 4 | 16 | 0.061368 | 0.24547300 |
| Full house | 4 | 38 | 0.026191 | 0.10476500 |
| Flush | 3 | 47 | 0.021058 | 0.06317400 |
| Straight | 2 | 17 | 0.057783 | 0.11556500 |
| Three of a kind | 1 | 4 | 0.267871 | 0.26787100 |
| | | | | 0.97055400 |

TABLE 2

IGT Video Poker Paytables with secondary game outcome enabled MEGABUCKS WAP

| | Pay | Odds | Probability | Return |
|---|---|---|---|---|
| MEGA BUCKS - Jacks or Better Hand | | | | |
| "MEGABUCKS" all Cards | 100% | 100,000,000 | 0.00000001 | 0.00200000 |
| Royal flush | 800 | 40,177 | 0.00002489 | 0.01991548 |
| Straight flush | 50 | 9,289 | 0.00010766 | 0.00538321 |
| Four of a kind | 25 | 423 | 0.00236289 | 0.05907222 |
| Full house | 8 | 87 | 0.01151368 | 0.09210942 |
| Flush | 5 | 92 | 0.01090156 | 0.05450781 |
| Straight | 4 | 89 | 0.01123512 | 0.04494050 |
| Three of a kind | 3 | 13 | 0.07446275 | 0.22338824 |
| Two pair | 2 | 8 | 0.12929841 | 0.25859682 |
| Pair | 1 | 5 | 0.21507064 | 0.21507064 |
| | | | | 0.97498434 |
| MEGA BUCKS - Joker Poker Hand | | | | |
| "MEGABUCKS" all Cards | 100% | 100,000,000 | 0.00000001 | 0.00200000 |
| Natural royal flush | 800 | 40,000 | 0.00002500 | 0.01976900 |
| Five of a kind | 200 | 10,753 | 0.00009300 | 0.01858700 |
| Wild royal flush | 100 | 9,615 | 0.00010400 | 0.01039900 |
| Straight flush | 50 | 1,684 | 0.00059400 | 0.02970600 |
| Four of a kind | 17 | 118 | 0.00850700 | 0.14461200 |
| Full house | 7 | 64 | 0.01562600 | 0.10938500 |
| Flush | 5 | 63 | 0.01583900 | 0.07919500 |
| Straight | 3 | 59 | 0.01685300 | 0.05056000 |
| Three of a kind | 2 | 8 | 0.13331300 | 0.26662600 |
| Two pair | 1 | 9 | 0.11066700 | 0.11066700 |
| Kings or better | 1 | 7 | 0.14134800 | 0.14134800 |
| | | | | 0.98285400 |
| MEGA BUCKS - Deuces Wild Hand | | | | |
| "MEGABUCKS" all Cards | 100% | 100,000,000 | 0.00000001 | 0.00200000 |
| Natural Royal flush | 800 | 43,478 | 0.00002300 | 0.01815400 |
| Four deuces | 200 | 5,236 | 0.00019100 | 0.03815200 |
| Wild royal flush | 20 | 552 | 0.00181200 | 0.03624000 |

TABLE 2-continued

IGT Video Poker Paytables with secondary game outcome enabled MEGABUCKS WAP

| | Pay | Odds | Probability | Return |
|---|---|---|---|---|
| Five of a kind | 12 | 331 | 0.00301800 | 0.03621000 |
| Straight flush | 9 | 200 | 0.00499400 | 0.04495000 |
| Four of a kind | 4 | 16 | 0.06136800 | 0.24547300 |
| Full house | 4 | 38 | 0.02619100 | 0.10476500 |
| Flush | 3 | 47 | 0.02105800 | 0.06317400 |
| Straight | 2 | 17 | 0.05778300 | 0.11556500 |
| Three of a kind | 1 | 4 | 0.26787100 | 0.26787100 |
| | | | | 0.97255400 |

TABLE 3

IGT video poker secondary game outcome ™ enabled MEGABUCKS Jackpot for Nevada

| Video Poker Machine IGT video pokers any device | Hands Per Hour | (18 Hours Est.) Per Day Hands | # of Machines | Hands per Day |
|---|---|---|---|---|
| | 500 | 9000 | 1,000 | 9,000,000 |
| | | | | 9,000,000 |

| | | |
|---|---|---|
| MEGABUCKS WAP Odds | | 100,000,000 to 1 |
| MEGABUCKS Jackpot Seed | | $1,000,000 |
| Denomination | | 1 |
| Wager Required for Jackpot | | 5 |
| Wager contribution % to JP | | 2.00% |
| Amount to JP per Play | $ | 0.1000 |

| Average MegaBucks Jackpot Win | Hit Frequency (Days) |
|---|---|
| $11,000,000.00 | 11.11 |

3) Secondary Game Outcome Card Game Lingo Poker

Lingo is a television game show whereby players try and obtain the 5 letter word LINGO in a matrix. This game and details of its play are public information and known to those skilled in the art.

As a specific example, one embodiment of the present invention enables play of a card game that offers to the player application of words to one or more card hands dealt during the play of a card game. As noted previously, U.S. Pat. No. 7,980,933 provides disclosure of assigning symbols of various event outcomes to cards used in a card game. In the present invention, utilization of this method can be extended to enable a certain word such as "BONUS" to be spelled with letters assigned to one or more playing cards in a card game.

An electronic apparatus can be programmed with software steps to select one or more words from a collection of words. Upon selection of the word, the device is programmed to assign one or more letters used in the spelling of the word to one or more cards in a hand of cards dealt in a card game. Upon obtaining said one or more words spelled from the letters displayed upon one or more cards, a player can win an award.

In an example of this operation, an electronic card gaming apparatus is programmed with steps to randomly deal playing cards to one or more player hands. Prior to, in parallel with, or after programmed steps of selection of each card to display in said card game, the apparatus conducts a second game of chance whereby it conducts a selection of choosing one or more words or no word at all.

Upon selection of no word, the apparatus utilizes in the said card game playing cards with card suits and card values, but no additional indicia of alphabet letters upon them. Upon selection of a word from said word selection game of chance, the apparatus is programmed with steps to place one letter or more letters used in said selected word upon one or more cards dealt to form a card hand.

In a further embodiment of the invention, letters selected in said second game of chance are assigned to one or more cards used in the game play regardless of what hand they are dealt to. In this example, letters assigned to one player's card hand could be combined with letters assigned to another player's card hand or a dealer card hand. It is further disclosed that multiple hands could form multiple words that together could form a phrase or a sentence.

In yet a further embodiment of this invention, letters can be randomly assigned to one or more playing cards in a card game and upon spelling a word, such as "LINGO," the device can pay an award. One embodiment entails the apparatus to be programmed with steps for referencing a collection of words, such as a dictionary or database, in order to score each collection of letters dealt to said one or more cards in said card game and determine if a word has been spelled. Upon spelling of a word the device can pay an award.

It is presented herein that card games can be improved by offering awards based upon the spelling of certain words that are presented in the play of card games. The words can be spelled by random selection of the letters wherein one or more letters are assigned randomly to one or more cards used in card game play. Additionally, it is disclosed herein wherein words can be spelled by executing a selection step of instruction prior to or during each card game play where if a word is selected to be displayed per hand of play, then an instruction is executed to assign certain letters to certain cards used to form a player hand.

It is known by those skilled in the art, that video poker games exist that have special symbols upon one or more of the cards. The prior methodology has certain limitations. First, pre-assignment of some of the cards used in the game with the additional indicia omits every other playing card from the possibility of using the card in the special award. Additionally, pre-assignment of certain indicia to cards as taught in these methods is limited to outcomes that are no more than the possible number of combinations in the number of cards used in the game play.

For example, the majority of 5 card video poker games use in operation a single deck of 52 cards. It is acknowledged that a 53 card deck using a single "Joker" wild card is also common. But for illustration, a video poker game using a standard deck of 52 cards is limited to a possible number of total combinations of 5 card hands equal to 2,598,960. Thus, regardless of the manner in which additional indicia are assigned, this is the limitation of possible 5 card hands.

This limitation is overcome by a new method and apparatus disclosed herein that first conducts a selection step prior to or during play of a card game hand by a player in any card game, then second conducts an assignment of certain indicia to one or more cards used to form a hand(s) or collection(s) of cards used in card game play.

In one preferred example, a gaming program is developed to play a video draw poker game using a standard deck of 52 cards. This video poker game program randomly shuffles cards prior to each play of the game and deals 5 card hands upon each play.

Operating in a typical know manner by those skilled in the art, the gaming program starts a play of the game by dealing a first hand of 5 cards, then players are allowed to discard one or more cards and draw replacement cards from the same deck of cards. Upon selection of the cards to be discarded, the program replaces the cards marked to be discards by the player with replacement cards are drawn at these card locations from the remaining cards in the original deck of 52 cards.

Figure 4A:
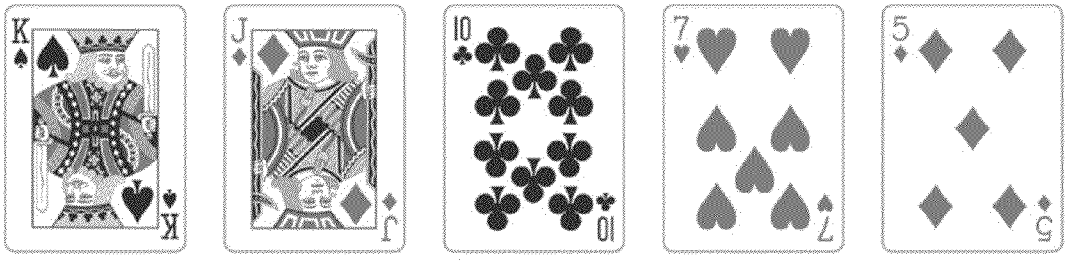
FIGS. 4A-4C illustrate a first set of card game hands that can be used in the embodiments of the present invention.
Figure 4B:
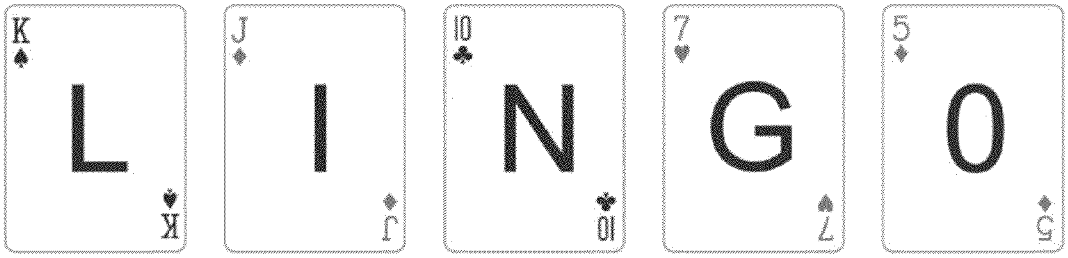
Figure 4C:
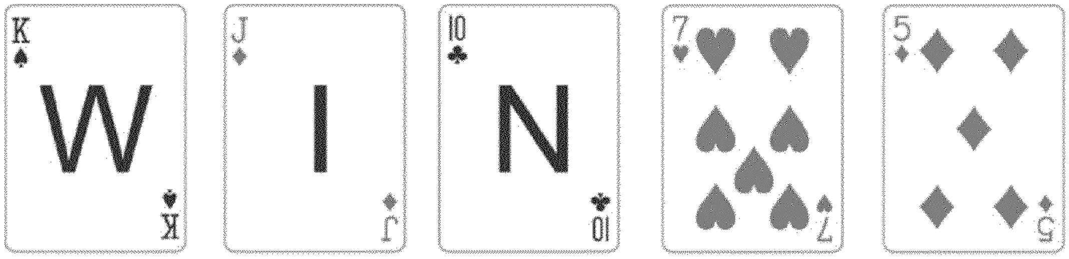

In this preferred example to disclose the new methodology and apparatus to conduct an improved card game, the program conducts in its execution a new additional selection step prior to dealing the initial 5 cards to a player. The program performs a calculation as if the forthcoming play of the game will be populated with the word "LINGO" in this example. The program executes with a processor the command to perform a random selection to determine if the next play of the device is assigned the word "LINGO". In this preferred example, the odds are 100,000,000 to 1 that the instruction of assigning the word "LINGO" will be instructed. Upon a calculation that instruction the program to assign the word "LINGO", the program then preferably assigns in this example to the first card the letter "L", the second card the letter "I", the third card the letter "N", the fourth card the letter "G", and the fifth card the letter "O". FIG. 4B illustrates the assignment of these letters to each card used in the play of the hand.

It is further disclosed that the said "LINGO" calculation could be performed between the stage whereby a player discards initial cards and draws replacement cards in the game of draw poker. In this example, a calculation would be performed before this stage of the game whereby replacement cards are drawn after a player makes discard selections. This is an improved version of draw poker enabling a player to be presented with a secondary game outcome award opportunity at the stage of deciding to draw cards or note. Should a player decide to draw cards then said player would be eligible for a secondary game outcome award.

Figure 5A:
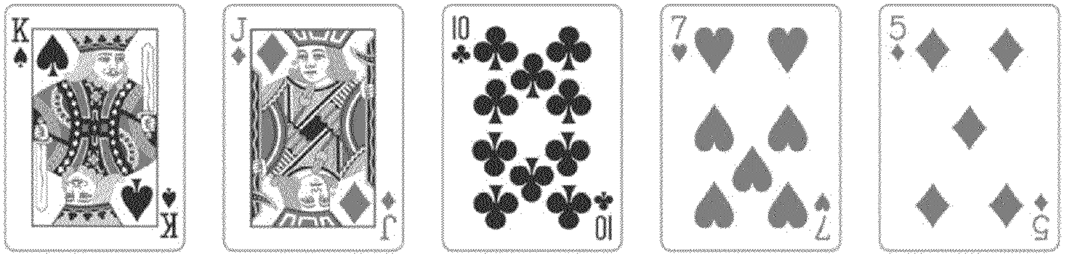
FIGS. 5A-5C illustrate a second set of card game hands that can be used in the embodiments of the present invention.
Figure 5B:
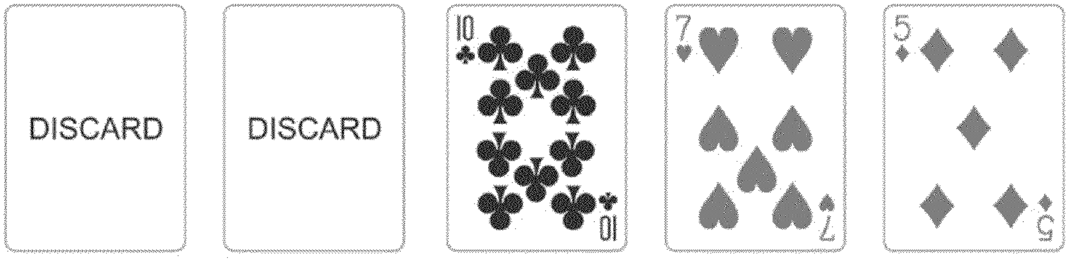

If a "LINGO" assignment is calculated by the selection process step at this stage, all the cards in play including cards that have not been discarded can be used to spell the "LINGO" in the same manner as described above and pictured in FIG. 4B. To further detail, an example would be a play of the device whereby all 5 cards dealt initially to a player hand are as pictured in FIG. 5A. A player decides to discard the first 2 cards in the hand as pictured in FIG. 5B. The program would determine the replacement cards to be dealt. In this example these cards are an Ace of Clubs for card position number 1 and a Queen of Clubs for card position number 2.

Figure 5C:
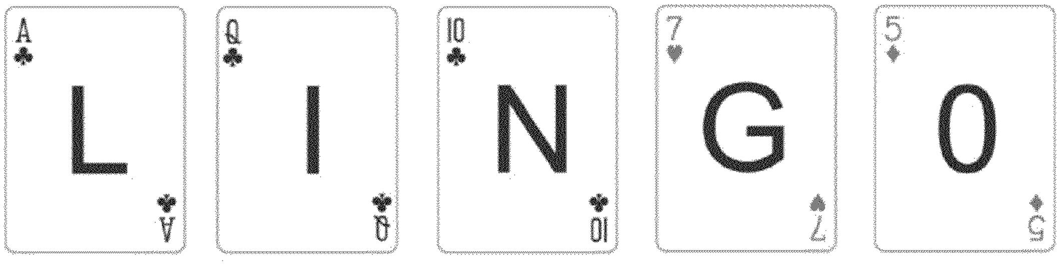

Upon performing a calculation and receiving an instruction to assign the word "LINGO" the program would display upon the device display the final five cards used to form the poker hand, and displayed upon the cards would be the word "LINGO" with each letter in this example assigned to each of the five cards as pictured in FIG. 5C. Thus, in this embodiment, game play can designed to include a $2^{nd}$ secondary game outcome server selection process prior to replacement cards being dealt enabling game players to win a secondary game outcome award. It is noted that both replacement cards to be drawn and existing cards not discarded can be redrawn to illustrate secondary game outcome symbols at any interval during card game play.

Figure 6A:
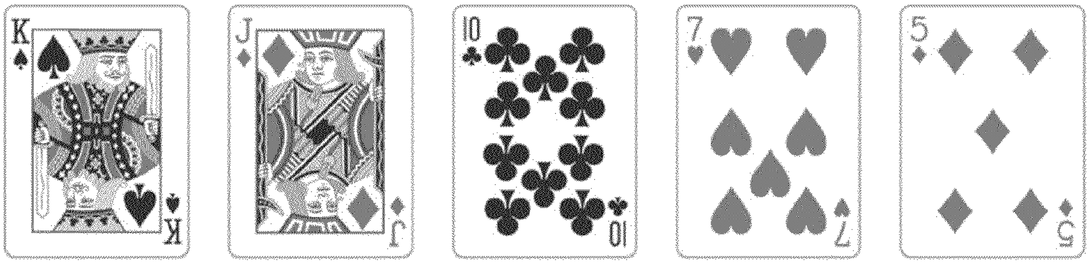
FIGS. 6A-6B illustrate a second set of card game hands that can be used in the embodiments of the present invention.
Figure 6B:
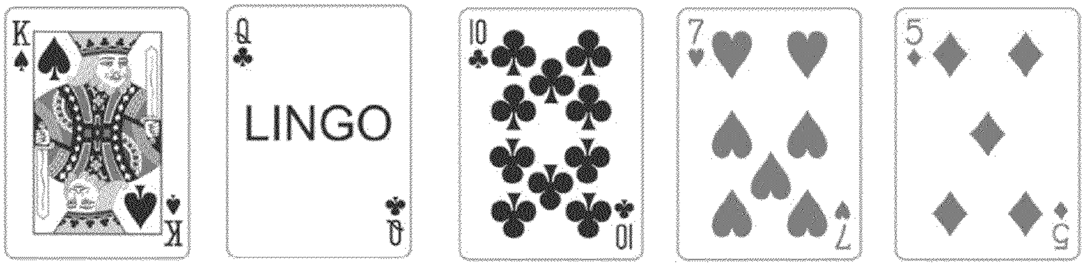

It is further noted that only one or more of the cards used in card game play need to be assigned indicia, in this example the word "LINGO," for awarding a prize utilizing the disclosed method and apparatus. FIG. 6A shows an initial hand of cards dealt to a player in game play. FIG. 6B shows the same hand after a player discards card #2, the Jack of Diamonds, and draws a replacement card the Queen of Clubs. The Queen of Clubs in this example was selected to be assigned the "LINGO" word and as a result an award can be awarded upon the device. This secondary game outcome symbol can be used to pay a secondary game outcome award and also this symbol can be used to enable the card game to utilize the card value, suit, or rank to be used as a wild card in the calculation of card game play rules and awards.

It is further disclosed that an improved version of multi hand poker games can be created using secondary game outcome playing cards. U.S. Pat. No. 5,823,873 to Moody, which is hereby incorporated by reference, discloses methods of card game play utilizing multiple poker hands and these are known by those skilled in the art. Five Play Poker is one of these games whereby players play possibly 5 hands per game round of play, utilizing up to 5 separate decks of cards.

Figure 7:
FIG. 7 illustrates a video poker new variation of FIVE PLAY poker in accordance with another embodiment of the present invention wherein the rows of cards are dealt in a 5 by 5 matrix. As with known FIVE PLAY poker, the rows detailed as 1, 2, 3, 4 and 5 are card hands dealt from separate decks of cards. This illustration depicts secondary game outcome symbols being assigned across multiple decks of cards and multiple hands of cards used in card game play.

FIG. 7 illustrates an improvement to the methods of Moody by enabling assignment of secondary game outcome symbols to certain cards in a coordinated manner across multiple decks of cards. More specifically, FIG. 7 illustrates a video poker new variation of FIVE play poker whereby the rows cards are dealt in a 5 by 5 matrix. As with known FIVE Play poker, the rows detailed as 1, 2, 3, 4, and 5 are card hands dealt from separate decks of cards. It is disclosed and this illustration depicts secondary game outcome symbols being assigned across multiple decks of cards and multiple hands of cards used in card game play. In Five Play Poker, players initially draw a single hand of 5 cards, thereafter they can choose to hold cards and upon drawing new cards, each hand is populated with replacement cards from differing respective decks per hand.

It is disclosed that secondary game outcome symbols can be assigned in a manner that can enable an award to be paid is a predetermined arrangement of secondary game outcome symbols is obtained whereby the assignment of secondary game outcome symbols can be to either a single hand of cards from a single deck of cards, or multiple hands of cards dealt from multiple decks of cards.

In this preferred embodiment, the word "LINGO" is spelled vertically in the first column. This is accomplished by after secondary game outcome server selection, one card being assigned a secondary game outcome symbol from each deck of the separate hands used in the electronic card game play. It is noted that any assignment of secondary game outcome symbols in any predetermined manner across one or more cards in one or more decks is possible. Additionally, this illustration depicts a bottom row of cards. As known in FIVE Play poker, cards can be initially held from the first deck and held in the additional hands as well. It is noted that if a secondary game outcome symbol card such as the first card in the bottom row populated here with the "O" is held, then additional secondary game outcome symbols, in this case letters, can be drawn in the additional 4 hands. This enables the word "LINGO" to be possibly spelled by holding the "O" symbol and/or card value.

It is disclosed that an assignment process can assign, as in this illustration, the letters of the word LINGO to one or more cards from each deck used in the play of the game to enable the word LINGO to be spelled. The alignment of these cards as depicted in the first column is a preferred embodiment. It is disclosed that any secondary game outcome symbol can be used and assigned in any manner across differing hands from the same or differing decks of cards. Additionally, alignment of the cards can either be in a row, column, diagonally, locations in a matrix, or simply miscellaneously located in one or more separate hands used in card game play.

It is disclosed that differing words spelled with secondary game outcome symbols upon a card hand can result in differing proportional jackpot awards. It is a preferred embodiment that a percentage of a jackpot award is paid with words that are spelled have differing numbers of letters utilized. The word WIN could be used to pay a 10% award of the jackpot. It is disclosed that any percentage could be paid with the word WIN.

Example words spelled with secondary game outcome symbols across card game hands that could be used as secondary game outcome awards are BONUS, WIN, POKER, MEGA, MEGABUCKS, MAX WIN, SUPER, LINGO, HAPPY, BIG, BIG TIME, SCRABBLE, and any other word in the English language.

Any collection of traditional playing can be assigned a secondary game outcome symbol by performing a random or weighted selection calculation of an independent game of chance, obtaining a result to said calculation, utilizing said result to affect secondary game outcome symbols upon said collection of playing cards. In a preferred embodiment a hand of 2, 3, 4, 5, 6, or 7 cards will be applied secondary game outcome symbols as a group based upon said result of calculation. This enables unification of all card games regardless of number of cards used in any card game or rules thereof. Secondary game outcome symbols are independent of the card game suit, rank, or color enabling traditional card game to operate unaffected.

Figure 8A:
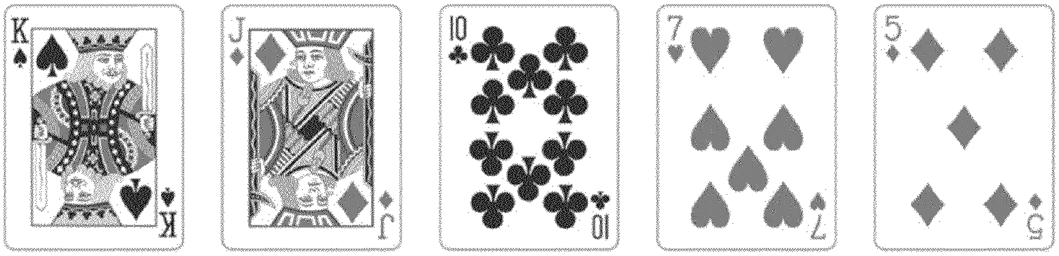
FIGS. 8A-8C illustrate yet another set of card game hands that can be used in the embodiments of the present invention.
Figure 8B:
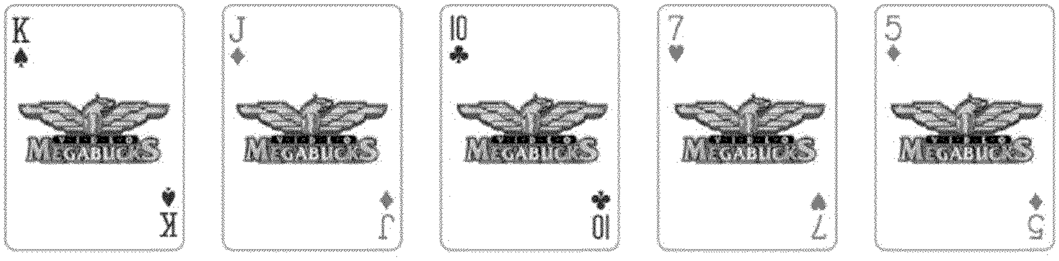
Figure 8C:
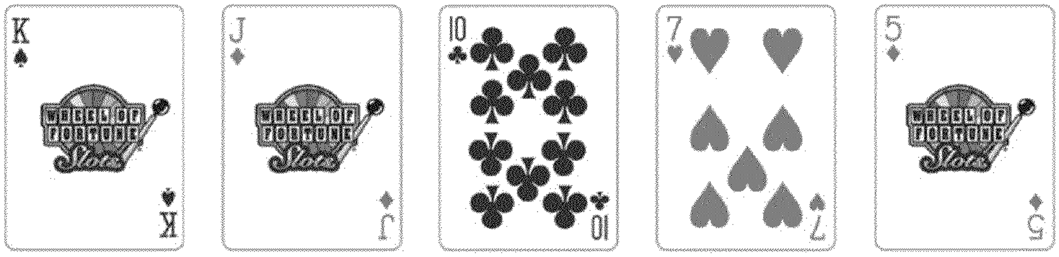

FIGS. 8A-8C illustrate additional card game hands that can be used in the disclosed invention. FIG. 8A illustrates is a set of 5 traditional cards dealt initially in a video poker card game. FIG. 8B illustrates the same set of five cards as in FIG. 8A, except that all cards have been selected to be populated with secondary game outcome symbols. In this case the secondary game outcome symbols are MEGABUCKS logos. It is noted that by a player holding all five cards after the initial deal of five cards dealt in a video poker game, a secondary game outcome server step could be performed whereby each card displayed is redrawn with secondary game outcome symbols. It is disclosed that anytime during play of any electronic card game secondary game outcome symbols can be calculated and drawn upon existing cards displayed in a card game.

FIG. 8C illustrates the same set of five cards as in FIG. 8A, whereby 3 cards have been selected to be populated with secondary game outcome symbols. In this case the secondary game outcome symbols are WHEEL OF FORTUNE logos. It is disclosed that as is the case with a card game hand obtaining one or more secondary game outcome symbols an award can include secondary game states such as bonus rounds and including electro-mechanical wheel spins such as the WHEEL OF FORTUNE signs used upon the IGT WHEEL OF FORTUNE slot machines.

Figure 9A:
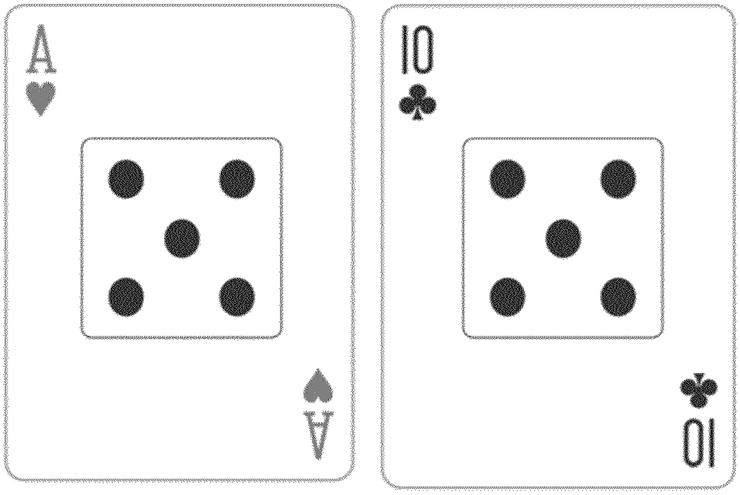
FIGS. 9A and 9B illustrate two card game hands dealt in the game of blackjack. Each of the cards used in each hand includes both conventional card values and symbols, as well as a secondary dice game outcome symbol.
Figure 9B:
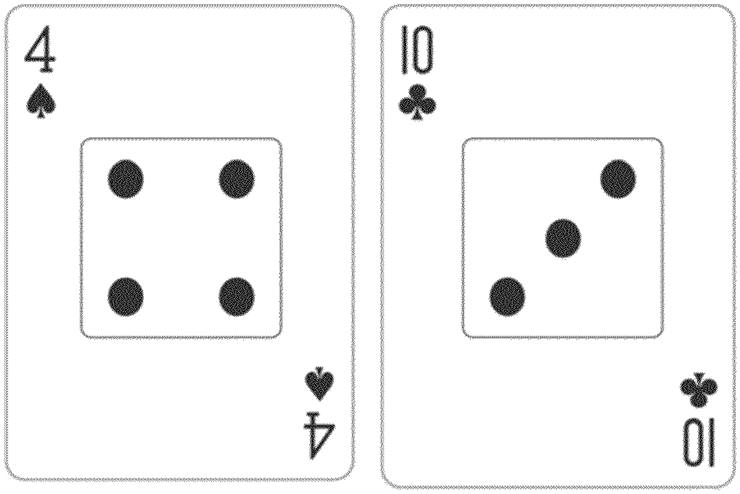

FIGS. 9A and 9B illustrate two card game hands dealt in the game of blackjack. In the first depiction in FIG. 9A, the hand has blackjack card game score of 21 or a natural blackjack; also this hand has a secondary game outcome symbol total value of 10. This is calculated by adding the secondary game outcome dice vales depicted of 5 and 5 upon the secondary game outcome symbols upon the two cards displayed.

In FIG. 9B, the hand has a blackjack card game score of 14, also this hand has a secondary game outcome symbol total value of 7. This is calculated by adding the secondary game outcome dice vales depicted of 4 and 3 upon the secondary game outcome symbols upon the two cards displayed.

This illustration depicts the hand in FIG. 9A winning a wager by having a secondary game outcome dice value higher than that of hand in FIG. 9B. It is disclosed that the card game score(s) and the secondary game outcome symbol value(s) can be added or used in any combination to be a factor of calculation in the rules of an electronic card game. It is disclosed that a condition of winning an award is for one hand to outscore another hand upon both the card game scoring and the secondary game outcome symbol scoring. Further, a hand winning 1 of 2 scoring criteria, or any subset of a total number, could remain in a game, push, or receive an award.

4) TABLEMAX Secondary Game Outcome Enabled WAP

For an overview of current eTable WAP operation using a current TABLEMAX enable WAP system, each TABLEMAX eTable device is connected to a WAP system and typically offers one or more progressive wagers to players. Said devices communicate the current progressive jackpot amount or contribution from play(s) to a WAP controller. As players play the progressive wagers upon the TABLEMAX eTable devices, a percentage of each wager is added to the jackpot amount by the central computer system. If a player at one of the TABLEMAX eTable devices obtains a predetermined card hand the player is awarded the jackpot total amount currently totaled by said WAP controller. Additionally, multiple jackpot pools for differing jackpot amounts are known to those skilled in the art. For each card game a differing pool is used to award a jackpot for that card game. For example, as illustrated in Table 4 below, two WAP pools that have previously existed are for the card games of Progressive Blackjack and Caribbean Stud Poker.

It has been the practice to start each progressive WAP with a seed value. This value, using $250,000 as an illustrative amount, is set aside for payment of the award when it is won. Currently, problems exist with this system architecture. First, numerous client eTables can award the progressive amount at any time. Although methods exist to reset the jackpot after a win on any one eTable, the fact that there exist multiple points of award determination versus a single point of award determination is viewed by many skilled in the art as not being as secure. Errors and malfunctions of gaming machines are known by those skilled in the art. Additionally, another problem with this described system is that the said predetermined card hand criteria is restrictive to and based upon the unique card game being played.

Table 4 shows two sets of criteria used upon TABLEMAX eTable devices to operate two distinct jackpots. These pay tables are utilized in conjunction with a 500 side wager. The odds of obtaining the top level Jackpot award in Progressive Blackjack are 18,940,155 to 1. The odds of winning the top level Jackpot award in Caribbean Stud Poker are 38,984,400 to 1. In a connected environment each of these distinct pools, Jackpot Pool 1 and Jackpot Pool 2, are started with a significant jackpot seed amount. The initial hand of blackjack is dealt with 2 cards. Players must take 2 cards to obtain the jackpot in Progressive Blackjack. The initial hand of Caribbean Stud Poker is dealt with 5 cards. Players are awarded the jackpot at the time just after the initial deal of the cards in Caribbean Stud Poker.

Table 5 details the improvement to eTable WAP operations of this invention by using the disclosed method of secondary game outcome enabled WAPs any eTable can play any card game with any other electronic card game.

The secondary game outcome symbols used in this preferred embodiment are in shown in FIGS. 10A-10F which illustrate several differing hands of cards used in various electronic card games. In particular, FIG. 10A illustrates is a set of two cards dealt initially in the game of blackjack. FIG. 10B illustrates is a set of five cards dealt initially in a game of poker. FIGS. 10C-10F illustrate cards dealt during the stages of the poker game Texas Hold'em poker. More specifically, FIG. 10C depicts the two cards dealt initially to a player hand; FIG. 10D shows the three cards dealt to a flop hand; FIG. 10E shows the turn card dealt; and FIG. 10F shows the river card dealt.

Each of the cards in FIGS. 10A-10F depicts that secondary game outcome symbols of "MAX WIN" can be populated during each play of any electronic card game regardless of the number of playing cards required to be dealt in the particular card game being played.

The odds of any hand depicted in either the two card hand of FIG. 10A, the five card hand of FIG. 10B, or the 7 card hand of FIGS. 10C-10F being assigned one or more secondary game outcome symbols are each equally the same odds. It is disclosed that any card game such as Three Card Poker wherein 3 cards are dealt to player(s), or any number of cards per play of a hand can be operated to have the same statistical probability of secondary game outcome symbol assignment resulting in the ability to operate a secondary game outcome WAP or offer a secondary game outcome award across networks of various differing electronic card games.

Figure 11:
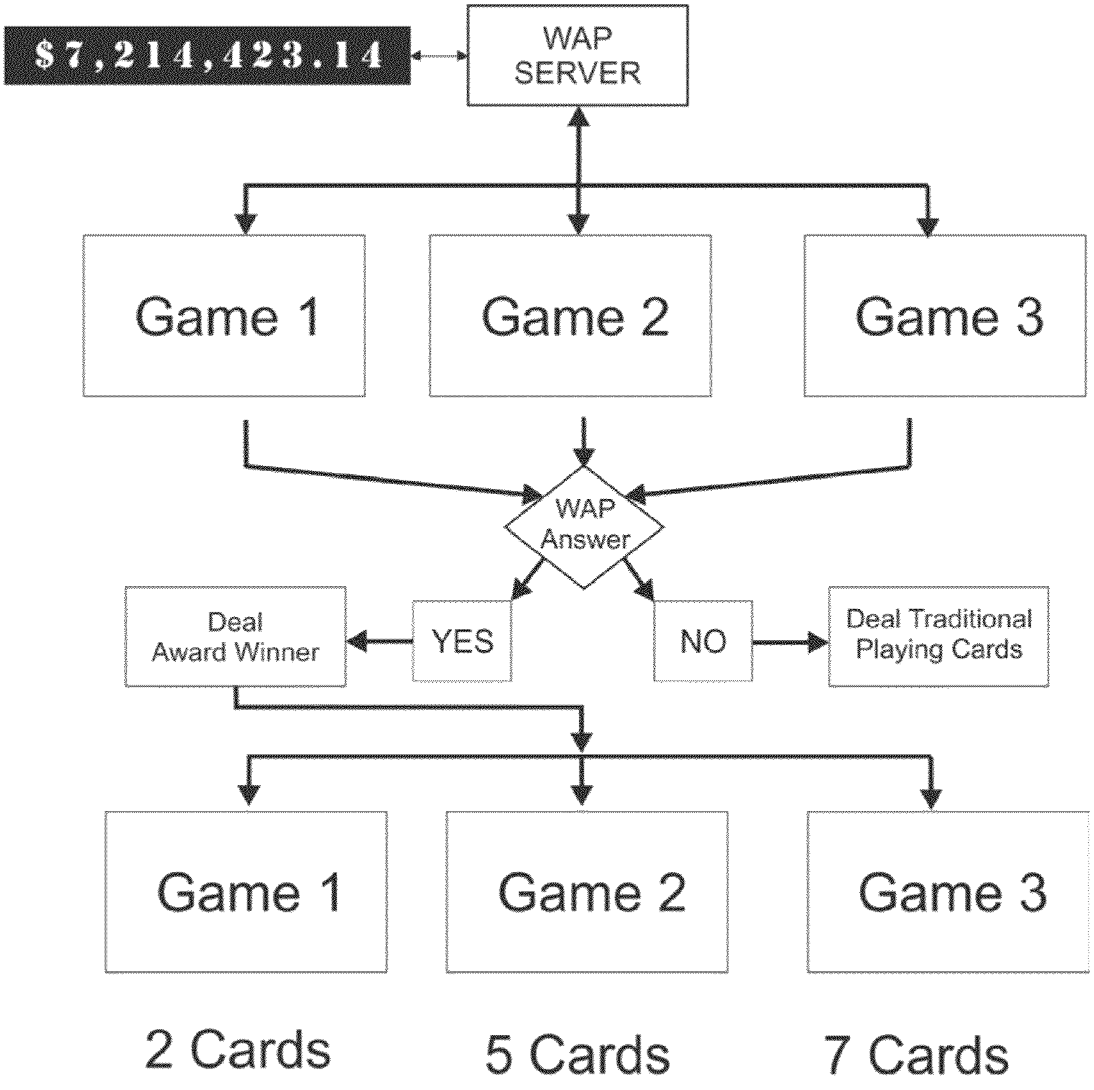
FIG. 11 illustrates a TABLEMAX based MAXLINK WAP system. This depiction shows 3 differing card games being played upon TABLEMAX eTables that utilize in their respective operations differing numbers of cards to form card hands within the games. By assigning secondary game outcome symbols to one or more cards used to form a hand in each play of an electronic card game, this serves as a common denominator of play of any electronic card game.

FIG. 11 illustrates a WAP system that is preferably a TABLEMAX based MAXLINK system. This depiction shows 3 differing card games that can be played upon TABLEMAX eTables that utilize in their respective operations differing numbers of cards to form card hands within the games. By assigning secondary game outcome symbols to one or more cards used to form a hand in each play of an electronic card game, this serves as a common denominator of play of any electronic card game. For example, the odds of assignment using a secondary game outcome server assignment process or secondary game outcome WAP server could be for example 10,000,000 to 1 of a hand having one or more cards populated with secondary game outcome symbols.

Therefore, as the secondary game outcome server views each hand or round of card game play as a single assignment event the actual number of cards utilized in the play of the underlying card game is not a factor. It is disclosed that a secondary game outcome Server WAP network of TABLEMAX eTables with several said eTables running differing card games including several from the selection of blackjack games, poker games, baccarat games, and PIA GOW poker games could be operated in conjunction with numerous video poker devices and internet gaming applications each operating various variations of video poker and other card games. This said secondary game outcome Server WAP network would enable millions of hands played daily and large Wide Area Progressive (WAP) jackpot wins in a manner whereby each rounds of play upon any card game on the WAP network has the same statistical chance of winning the jackpot prize regardless of the cards used in the play of the game or the formation of a card game hand.

FIG. 11 illustrates a flow chart of this preferred embodiment with a larger progressive win being offered by a WAP server. The three card games shown can be different from one another, such as Roulette 21, Caribbean Stud Poker, and Texas Hold'em bonus poker, each of which utilize differing numbers of cards in a round of play in the respective card games. However, by each card game program communicating with the WAP server, before each hand is dealt a decision is made to award the jackpot amount or not by either drawing cards with the secondary game outcome symbols or drawing cards without said secondary game outcome symbols.

Upon receipt of an instruction from the WAP server to award the jackpot, the respective client electronic card game would populate one or more cards dealt in the next or a future hand of cards to be played upon the respective device.

In one preferred embodiment, the secondary game outcome symbols displayed for award of the jackpot would be dealt upon the first cards dealt in play upon the rules of play upon the respective client electronic card game. In the case of blackjack and/or the Roulette 21 game this would be the first 2 cards dealt to a player in play of a new round or hand of card game play. In the case of poker or Caribbean Stud Poker this would be the first 5 cards dealt to a player in play of a new round or hand of card game play. In the case of Texas Hold'em Poker this would be the first 2 or the total 7 cards dealt to a player in play of a new round or hand of card game play.

It is noted that Roulette 21 is a secondary game outcome enabled card game that operates a progressive jackpot wager. Secondary game outcome enabled WAPs can be utilized with other secondary game outcome card games to offer additional secondary game outcome awards. Card games such as ROLL THE DICE Poker that do not have a progressive jackpot, but rather have one or more wagers that are based upon secondary game outcome symbols and pay awards of fixed odds can be operated whereby a % of each wager that is placed upon one or more secondary game outcome based wagers can be contributed to the WAP or one or more progressive jackpot pools.

TABLE 4

TABLEMAX Card Games with separate Jackpot pools

| TABLEMAX - Progressive Blackjack | | | (Jackpot Pool 1) |
|---|---|---|---|
| Hand | Pay | Odds | Probability |
| 4 Suited Aces | 100% | 18,940,155 | 0.00000005280 |
| 4 Colored Aces | 10000 | 557,063 | 0.00000179513 |
| 3 Suited Aces | 2500 | 94,701 | 0.00001055958 |
| 4 Any Aces | 1000 | 45,971 | 0.00002175273 |
| 3 Colored Aces | 125 | 16,441 | 0.00006082316 |
| 3 Any Aces | 50 | 3,523 | 0.00028384139 |
| 2 Suited Aces | 25 | 962 | 0.00103906225 |
| 2 Colored Aces | 15 | 722 | 0.00138541633 |
| 2 Any Ace | 5 | 361 | 0.00277083266 |
| 1 Ace | 1 | 14 | 0.07134894091 |
| **TableMAX ® - Caribbean Stud** | | | **(Jackpot Pool 2)** |
| Hand | Pay | Odds | Probability |
| Sequential Royal Flush | 100% | 38,984,400 | 0.0000000257 |
| Royal Flush | 12500 | 649,740 | 0.0000015391 |
| Straight Flush | 1250 | 72193 | 0.0000138517 |
| 4 of a Kind | 100 | 4165 | 0.0002400960 |
| Full House | 25 | 694 | 0.0014405762 |
| Flush | 20 | 509 | 0.0019654015 |
| Straight | 10 | 255 | 0.0039246468 |
| 3 of a Kind | 3 | 47 | 0.0211284514 |
| Two Pair | 1 | 21 | 0.0475390156 |

TABLE 5

TableMAX ® Card Games with MAXLink ® WAP

| | Pay | Odds | (Jackpot Pool 1) Probability |
|---|---|---|---|
| **TableMAX ® - Progressive Blackjack Hand** | | | |
| "MAX Win" Symbols | 100% | 50,000,000 | 0.0000000200 |
| 4 Suited Aces | 25000 | 18,940,155 | 0.0000000528 |
| 4 Colored Aces | 10000 | 557,063 | 0.0000017951 |
| 3 Suited Aces | 2500 | 94,701 | 0.0000105596 |
| 4 Any Aces | 1000 | 45,971 | 0.0000217527 |
| 3 Colored Aces | 125 | 16,441 | 0.0000608232 |
| 3 Any Aces | 50 | 3,523 | 0.0002838414 |
| 2 Suited Aces | 25 | 962 | 0.0010390622 |

TABLE 5-continued

| TableMAX ® Card Games with MAXLink ® WAP | Pay | Odds | (Jackpot Pool 1) Probability |
|---|---|---|---|
| 2 Colored Aces | 15 | 722 | 0.0013854163 |
| 2 Any Ace | 5 | 361 | 0.0027708327 |
| 1 Ace | 1 | 14 | 0.0713489409 |
| TableMAX ® - Caribbean Stud Poker Hand | | | |
| "MAX Win" Symbols | 100% | 50,000,000 | 0.0000000200 |
| Sequential Royal Flush | 25000 | 38,984,400 | 0.0000000257 |
| Royal Flush | 12500 | 649,740 | 0.0000015391 |
| Straight Flush | 1250 | 72193 | 0.0000138517 |
| 4 of a Kind | 100 | 4165 | 0.0002400960 |
| Full House | 25 | 694 | 0.0014405762 |
| Flush | 20 | 509 | 0.0019654015 |
| Straight | 10 | 255 | 0.0039246468 |
| 3 of a Kind | 3 | 47 | 0.0211284514 |
| Two Pair | 1 | 21 | 0.0475390156 |

5) Secondary Game Outcome Card Games and Assignment of Secondary Game Outcome Symbols to One or More Cards Used to Form a Hand of Cards in Card Games It is disclosed that hands of playing cards can be determined prior to display or dealing in electronic card game and the secondary game outcome symbols can be calculated and assigned to one or more cards as a group or collection of cards.

In one preferred embodiment to illustrate, as illustrated in FIG. 3, a card game application prior to dealing cards used in game play communicated with a secondary game outcome server. The calling card game application requests if a next hand used in card game play is a secondary game outcome award winner or not.

The secondary game outcome server can calculate outcomes using random or any other means of calculation. Upon performing a calculation the secondary game outcome server communicates a response to the calling card game application instructing as to the assignment of secondary game outcome symbols for the next hands of cards used in game.

If the instruction is NO, the calling card game application deals traditional cards upon the next hand of card game play. If the instruction of YES, the calling card game application deals cards with secondary game outcome symbols upon them in a predetermined manner. In this case, spelling the word "BONUS" across each of the 5 cards used in game card play by applying a single letter to each of 5 cards used to form a 5 card hand.

A preferred embodiment of the secondary game outcome Server logic used to assign secondary game outcome symbols would include input data or message input that details the cards in a unique hand of cards that possibly will be the target of any secondary game outcome symbol assignment. This detail could include the order of the cards as dealt or to be dealt. This input data could be used as a factor of calculation in the assignment or order of the secondary game outcome symbols upon said hand in card game.

It is disclosed that only card game hands of certain ranks, suits, or values could be eligible for secondary game outcome award assignment. For example only blackjacks in an electronic card game of blackjack could be eligible for secondary game outcome symbol assignment and/or secondary game outcome awards. In an electronic card game of poker, one embodiment would be that only a pair or better could be eligible for secondary game outcome symbol assignment and/or secondary game outcome awards.

Figure 12:
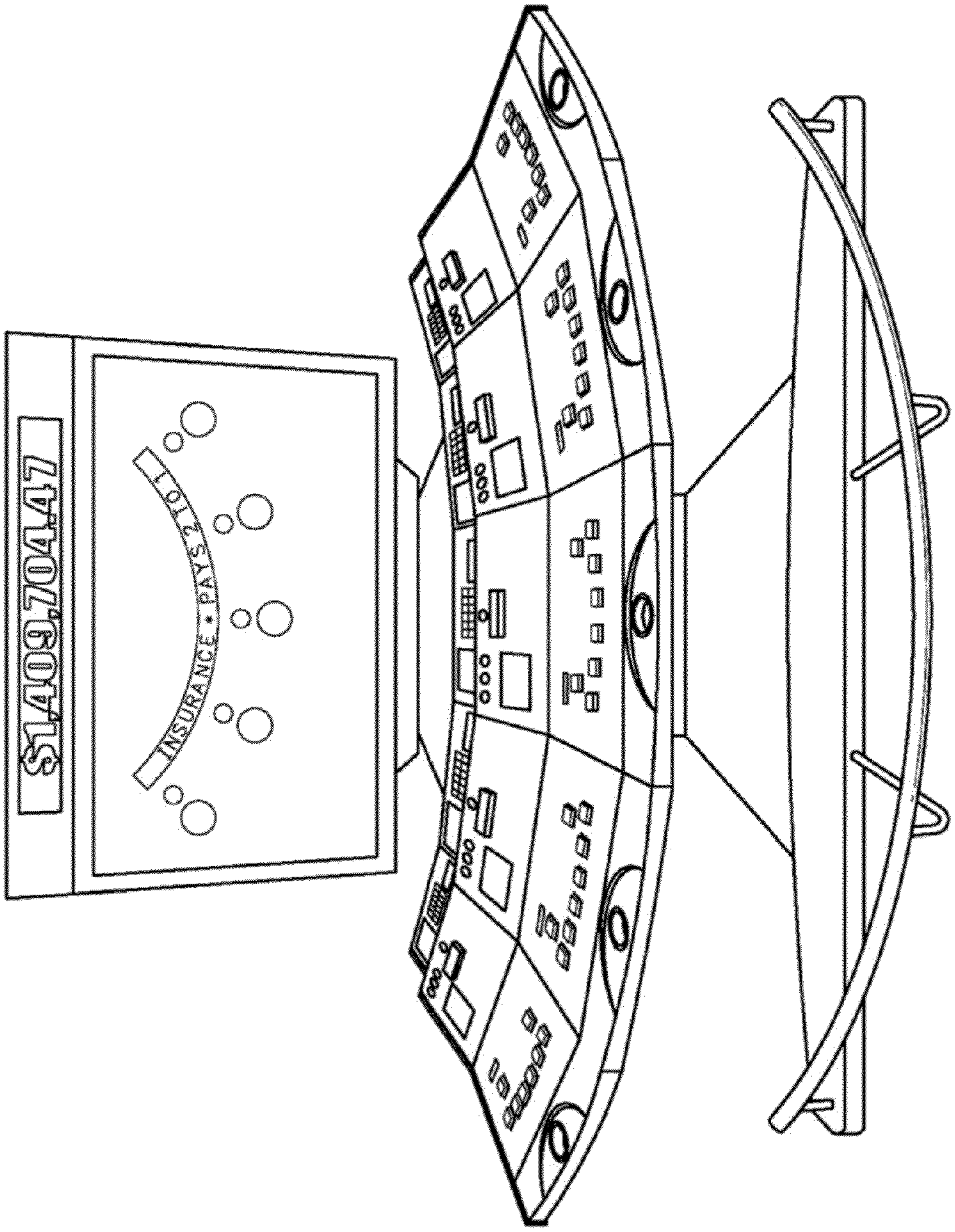
FIG. 12 illustrates a TABLEMAX brand multiplayer electronic table game of the type referred to herein and in the industry as an eTable.

FIG. 12 illustrates a TABLEMAX electronic table game referred to herein and in the industry as an eTable. It is noted that any configuration of an electronic table game wherein more than one player plays an electronic card game together could be utilized with the disclosed inventions herein.

Figure 13:
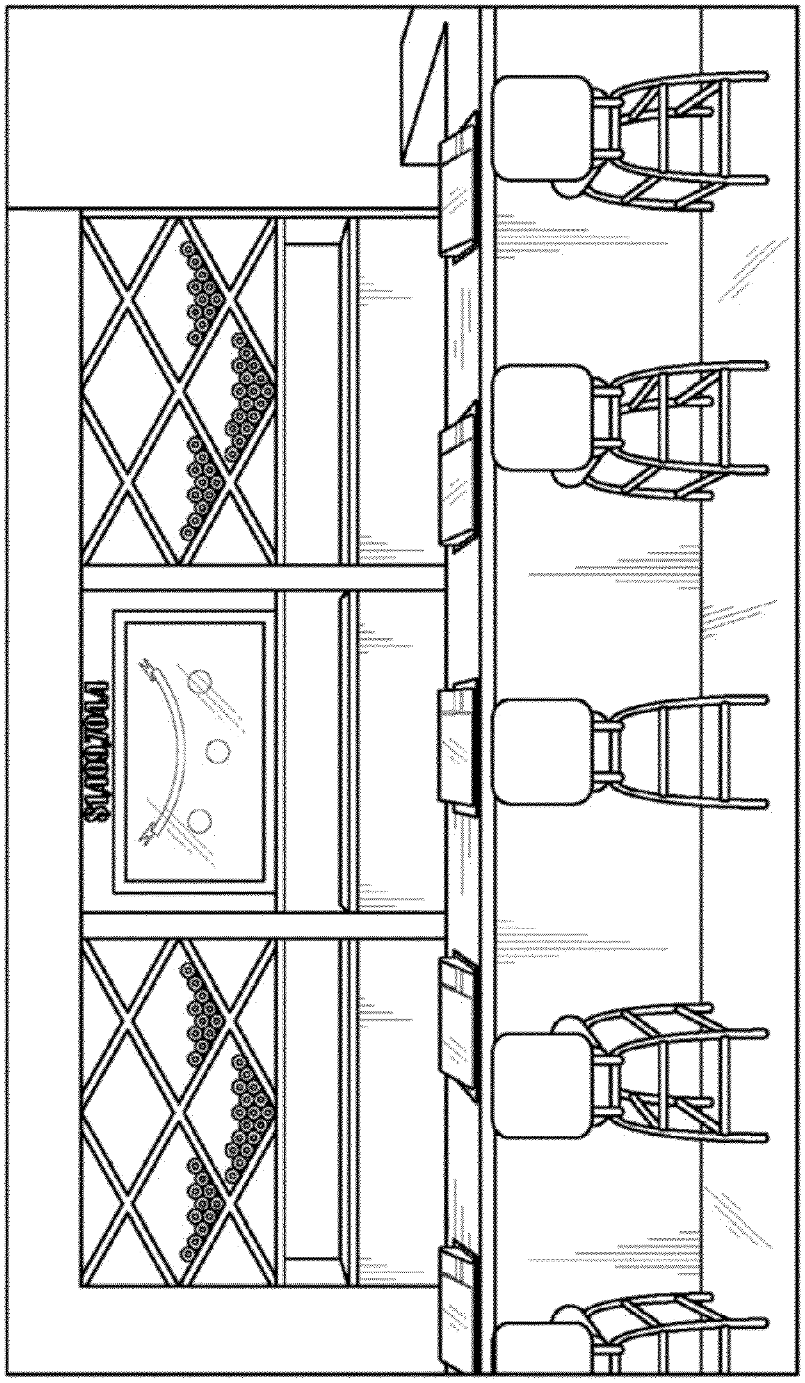
FIG. 13 illustrates an electronic table card gaming device system brand named BARMAX. This device is used to facilitate the play of multiplayer electronic table card games utilizing bar top video terminals.

FIG. 13 electronic table card gaming device system brand named BARMAX. This device is used to facilitate the play of multiplayer electronic table card games utilizing bar top video terminals.

6) Secondary Game Outcome Cards and Real Time Events/Future Events

It is disclosed that real time events could be used as criteria for secondary game outcome symbols. A network of dog races could be monitored and digitally represented as secondary game outcome symbols used in card game play. In this embodiment a secondary game outcome SERVER would be in internet communication with a number of dog race tracks globally. Upon receiving race event outcome information the secondary game outcome server could serve these results to be used as secondary game outcome symbols upon cards dealt to players on remote internet connected electronic card games. Any sporting event or race event could be utilized.

It is disclosed that game play of secondary game outcome symbols could be utilized to play card games in advance of an independent event and pay a secondary game outcome award after completion of said independent event. This independent event could be a sporting event, a race, a dog race, a horse race, another gaming machine play, a lottery, a keno draw. Any event that could be utilized as a secondary game outcome symbol In this embodiment play of a card game could include collecting secondary game outcome Symbols in advance of said event being executed. After said event is completed secondary game outcome awards could be paid based upon at least in part the outcome of said independent event.

A preferred embodiment is a tournament version of an electronic card game whereby players are awarded certain secondary game outcome symbols as awards from card game play during an interval of time prior to an independent event. For example, players play a NASCAR version of the secondary game outcome card game Bonus Blackjack in advance of the Daytona 500 race. During card game play preceding the race, players could win one or more awards whereby they win a secondary game outcome Symbol one of the drivers from the pool of all drivers in the race. Upon completion of the race, the previous player who obtained the secondary game outcome symbol for the driver that won the Daytona 500 race wins an award. Any future event could be used in this manner to play a secondary game outcome card game with any electronic card game.

7) Secondary Game Outcome Software Architecture

It is a preferred embodiment of this invention that a software object be created to encapsulate secondary game outcome Symbol random or weighted selection and assignment of said symbol to playing cards to enable the forming of secondary game outcome Playing Cards. In this embodiment many of the functions required to be performed by any electronic card game playing secondary game outcome card games can be simplified.

It is disclosed that a software object, class, or module can be created whereby a calling application sets one or more properties upon said software object detailing the type of secondary game outcome symbol desired to be played in the unique card game.

For example, if dice are chosen as the secondary game outcome symbol, the software object will provide via an exposed method call such as "Get_secondary game outcome_Card" for example, a method that enables a calling application to pass by parameter the specific traditional playing card value and suit to be dealt in the card game and the software object then returns a graphic object of the said traditional card value and suit but with the secondary game outcome symbol applied also.

This object will encapsulate the random or weighted generation process step, the selection of secondary game outcome Symbol artwork step based upon the property setting of the desired secondary game outcome symbol, the application will then select a graphic of the traditional playing card value and suit as requested by client request, the application will then graphically combine the elements into a single graphic object, the application will then return this graphic to the calling application.

It is noted that the preferred object could utilize a remote call such as communicating with a server for the purpose of obtaining a random seed or value, downloading secondary game outcome symbols, downloading playing card graphics, etc. Also, the object could be digitally signed to enable calling application to verify it for security.

The advantage of the preferred software object is that numerous differing electronic card game applications could utilize this reusable software library, object, or service to deliver licensed secondary game outcome Playing cards to a number of electronic card games. This would enable standardization and enable rapid application development as a result.

For example, IGT video poker developers could display the same playing cards and symbols upon video pokers as are utilized by internet gaming applications. Using server based services for this architecture is a preferred embodiment.

8) Secondary Game Outcome Card Game—BLACKJACK SHOOTOUT

Blackjack is well known by those skilled in the art. Numerous versions and variations exist. It is an object of the invention of this application to disclose an improved blackjack game, referred to herein as BLACKJACK SHOOTOUT that uses in its operation secondary game Outcome™ playing cards using dice outcome symbols upon the playing cards. These dice outcome event symbols are randomly generated and assigned to the playing cards utilized in the blackjack card game.

The game BLACKJACK SHOOTOUT can be played with any existing blackjack card game rules or variations. It introduces to the player one or more side wager options that enable players to place a side wager in the blackjack card game. This wager can be placed before during or after the blackjack card game. However, in this preferred embodiment a side wager is offered to all players prior to the cards being dealt in the blackjack game. Players have the option of placing aside wager whereby the wager is paid to the player with the highest dice value based upon the sum total of the dice symbols upon the first two playing cards used in the blackjack game dealt to each player's respective hand. This side wager is referred to hereafter as the "Shootout Bonus" wager.

By way of example, two players are playing the game at stations 1 and 3 upon a TABLEMAX electronic table game. Both players wager $10 upon the "Shootout Bonus" side wager.

Player 1 received a first card with a card value of 10 and a dice value of 5, also said player receives a second card with a card value of Jack and dice value of 3. Thus, player 1 has a total dice value of 8. Player 2 received a first card with a card value of 10 and a dice value of 3, also said player receives a second card with a card value of 4 and dice value of 4. Thus, player 2 has a total dice value of 7.

In this example, Player 1 would win the "Shootout Bonus" side wager as a dice value of 8 beats a dice value of 7. In this preferred embodiment player 1 would receive $19.50. The house would charge a rake or commission upon the total amount of all the "Shootout Bonus" wagers of 2.5%. The house raking a wager pool is known to those skilled in the art of gaming. It is often done in the game of Pia Gow Poker and/or Baccarat. It is common in poker games whereby players are playing against each other and the house charges a fee for operating and facilitating the game of play.

It should be mentioned that any rake of these side wagers could be implemented. Rake amounts of 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 11%, 12%, 13%, 14%, 15%, 20%, and 25% are just some of the possible rake amounts that could be charged in the operation of this side wager.

It is one embodiment of this invention that upon a play of the game BLACKJACK SHOOTOUT, should two or more players tie on the stated "Shootout Bonus" side wagers by obtaining the same dice sum total value upon the first 2 cards dealt, then the amount of the pool would roll over to the next play of the game in the next round of play. Each round of the blackjack is one round of play in this preferred embodiment. It is noted that other alternative manners of administering rounds of play could be utilized including having multiple rounds of play per blackjack game round. A round of blackjack play is known, it is the action between the table being cleared of cards, the dealer dealing one or more players, settling wagers, and clearing cards before a new round of card game play.

It is a further embodiment of this invention, that the side wagers of each respective player be wagered against the Dealer's hand first 2 cards. In this embodiment players would have one or more side wagers and should their sum total dice value upon the first two cards dealt exceed the sum total dice value upon the first two cards dealt to the dealer's hand then the player would win the wager.

One preferred embodiment of this wager is to allow the wager to be paid even money upon a win. This way the odds of winning would be 50% with a 100% payback. The "Shootout Bonus" side wagers would be only permissible after a player places a wager upon the blackjack card game first. A second preferred embodiment is whereby the "Shootout" side wagers would be paid odds upon successfully winning against the dealer hand.

It is disclosed that multiple dice could be used to enable a higher sum total. For example, if each secondary game outcome playing card has 5 dice outcome symbols upon it, then the sum total of all dice upon the first two cards could be much higher. In this embodiment should a secondary game outcome playing card with more than one outcome symbols upon it be displayed with matching symbols then an award can be paid. For example, say there are 5 dice outcome indicia per secondary game outcome playing card. Should all 5 match then an award could be paid per card. Likewise, if one or more cards have matching symbols upon the same card and/or a predetermined arrangement of cards with multiple matching outcome symbols then and award can be paid. Multiple dice of differing colors could be used also.

It is a further object of this invention to introduce an improved baccarat card game. Baccarat can be substituted for blackjack or poker in any of the disclosed methods in this application. By way of example, a secondary game outcome card game BACCARAT SHOOTOUT could be developed whereby players wager upon either a dealer/banker hand or a player hand in the game of baccarat. Each player could be dealt their own respective hand to play against a common banker/dealer hand or a common player hand could be used. Wagers upon the "Shootout Bonus" side wagers in this embodiment would be won and split accordingly amongst the players that wagered successfully as a group.

It is a further object of this invention to introduce an improved poker card game. By way of example, a secondary game outcome card game of poker could be developed whereby players wager a "Shootout Bonus" side wagers. The wagers could be settled by the sum total of the dice dealt to each player in their respective poker hand. The winner would be as disclosed, the player with the highest sum total and preferably the device would charge a commission or rake before paying the winning player hand the award amount.

It is further disclosed that any side wager in any secondary game outcome card game, whereby players place a separate wager to win an award by obtaining a higher value, rank, or predetermined score of the secondary game outcome symbols against another card game player, the dealer, or a combination of other players and dealer hands can be made. A tournament secondary game outcome card game can be played with the secondary game outcome symbols serving in part as the criteria upon which a tournament win is calculated.

A progressive jackpot feature can be awarded upon a secondary game outcome card game using one or more secondary game outcome symbol values and the condition of a players' secondary game outcome symbol values and a comparison calculation to one or more other players and/or the dealer hand in a card game.

A progressive jackpot feature can be awarded upon a secondary game outcome card game using one or more secondary game outcome symbol values upon all secondary game outcome cards or any subset of secondary game outcome cards dealt upon a card game to more than one player.

The invention claimed is:

1. An electronic card gaming system comprising:

a first computer-based electronic card gaming device programmed with steps for executing a first electronic card game utilizing a first set of playing cards and displaying electronically generated graphics depictions of said playing cards;

a second computer-based electronic card gaming device programmed with steps for executing a second electronic card game utilizing a second set of playing cards and displaying electronically generated graphics depictions of said playing cards;

wherein said first and second electronic card games are different from one another and have different rules of play and odds of possible outcomes; and a central server computer programmed with steps for executing a progressive jackpot control system; and selecting one or more jackpot award events from a plurality of jackpot event outcomes based solely on play of a game by either of said first and second electronic gaming devices and not on any outcomes of said games so that the odds of being awarded a progressive jackpot are the same for both said first and second electronic gaming devices, said central server computer being in operative communication with said first and second electronic gaming devices;

wherein, if said server computer sends a message to one of said electronic card gaming devices including a progressive jackpot award, said electronic card gaming device is programmed to commence card game play by generating playing card graphics depictions including at least a card value and card suit; and one or more depictions of an additional predetermined graphical representation associated with a jackpot award, while if said server computer sends a message to said one of said electronic card gaming devices that does not include a progressive jackpot award, said electronic card gaming device is programmed to commence card game play by generating playing card graphics depictions without said one or more depictions of an additional predetermined graphical representation associated with a jackpot award.

2. The electronic card gaming system of claim 1, wherein each of said computer-based electronic card gaming devices is programmed to send a query to said server computer before game play inquiring whether said card gaming device has been selected to payout a progressive jackpot award upon commencement of the next round of card game play.

3. The electronic card gaming system of claim 2, wherein each of said computer-based electronic card gaming devices is programmed to send a query to said server computer before game play inquiring whether said card gaming device has been selected to payout a progressive jackpot award only if a player makes a side wager on the game being executed by said card gaming device.

4. The electronic card gaming system of claim 1, wherein, if said server computer sends a message to one of said electronic card gaming devices including a progressive jackpot award, said electronic card gaming device is programmed to commence card game play by generating graphics depictions of a plurality of playing cards, each of which includes a depiction of a letter that when combined form a word indicating award of a progressive jackpot.

5. The electronic card gaming system of claim 4, wherein said word indicating award of a progressive jackpot is BONUS.

6. The electronic card gaming system of claim 4, wherein different words indicating award of a progressive jackpot can be spelled on said playing cards, and said different words are selected to provide different percentages of a current value of the progressive jackpot.

7. The electronic card gaming system of claim 1, wherein each of said computer-based electronic card gaming devices is programmed to send a query to said server computer prior to a second deal of cards during play of a game, said query inquiring whether said card gaming device has been selected to payout a progressive jackpot award during said second deal of cards.

8. The electronic card gaming system of claim 1, wherein said first electronic card game is a poker game and said second electronic card game is a blackjack card game.

9. The electronic card gaming system of claim 8, wherein each of said computer-based electronic card gaming devices is programmed to send a query to said server computer before game play inquiring whether said card gaming device has been selected to payout a progressive jackpot award upon commencement of the next round of card game play.

10. The electronic card gaming system of claim 8, wherein each of said computer-based electronic card gaming devices is programmed to send a query to said server computer prior to a second deal of cards during play of a game, said query inquiring whether said card gaming device has been selected to payout a progressive jackpot award during said second deal of cards.

* * * * *